US012516269B2

(12) United States Patent
Nad et al.

(10) Patent No.: US 12,516,269 B2
(45) Date of Patent: Jan. 6, 2026

(54) DETERGENT FORMULATION

(71) Applicant: Dow Silicones Corporation, Midland, MI (US)

(72) Inventors: Saugata Nad, Brussels (BE); Serge Creutz, Liege (BE); Flore Vandemeulebroucke, Manage (BE); Rahma Benbakoura, Quaregnon (BE)

(73) Assignee: Dow Silicones Corporation, Midland, MI (US)

( * ) Notice: Subject to any disclaimer, the term of this patent is extended or adjusted under 35 U.S.C. 154(b) by 255 days.

(21) Appl. No.: 18/259,803

(22) PCT Filed: Feb. 22, 2022

(86) PCT No.: PCT/US2022/017187

§ 371 (c)(1),
(2) Date: Jun. 29, 2023

(87) PCT Pub. No.: WO2022/182615

PCT Pub. Date: Sep. 1, 2022

(65) Prior Publication Data

US 2024/0084221 A1 Mar. 14, 2024

Related U.S. Application Data

(60) Provisional application No. 63/153,402, filed on Feb. 25, 2021.

(51) Int. Cl.
*C11D 1/94* (2006.01)
*C11D 3/386* (2006.01)
*C11D 17/00* (2006.01)

(52) U.S. Cl.
CPC ................ *C11D 1/94* (2013.01); *C11D 3/386* (2013.01); *C11D 17/0086* (2013.01); *C11D 2111/12* (2024.01)

(58) Field of Classification Search
CPC ....... C11D 1/94; C11D 3/386; C11D 17/0086; C11D 2111/12; C11D 3/225
See application file for complete search history.

(56) References Cited

U.S. PATENT DOCUMENTS 4,175,183 A 11/1979 Ayers
4,321,367 A 3/1982 Cheng et al.
6,958,393 B2 10/2005 Schlesiger et al.
6,974,789 B1 12/2005 Whitaker et al.
7,041,168 B2 5/2006 Schlesiger et al.
8,680,032 B2 3/2014 Lachmann et al.
10,150,704 B2 12/2018 Hild et al.
10,494,303 B2 12/2019 Breckwoldt et al.
2004/0127700 A1 7/2004 Schlesiger et al.
2021/0139817 A1* 5/2021 Bauer ............ C12Y 301/01003

FOREIGN PATENT DOCUMENTS

| | | | |
|---|---|---|---|
| CN | 103553418 | 2/2014 | |
| DE | 202010008420 | 12/2010 | |
| EP | 0100125 | 2/1984 | |
| EP | 1625195 | 2/2006 | |
| EP | 2083066 A1 | 7/2009 | |
| EP | 3572435 A1 | 11/2019 | |
| JP | 2014218465 | 11/2014 | |
| WO | WO-0233037 A1 * | 4/2002 | ......... C11D 17/0086 |
| WO | WO-0233038 A2 * | 4/2002 | ............... C11D 3/18 |
| WO | 2009093150 | 7/2009 | |
| WO | 2016066812 | 5/2016 | |
| WO | 2020051049 A1 | 3/2020 | |
| WO | 2020176211 | 9/2020 | |
| WO | 2020223037 | 11/2020 | |
| WO | 2020223039 | 11/2020 | |
| WO | 2020223040 | 11/2020 | |

OTHER PUBLICATIONS

Davaran et al., Synthetis of chemically cross-linked hydroxpropyl methycellulose hyrogels and their application in controlled release of 5-amino salicylic acid, 2007, Drug Dev Ind Pharm, 33 (8), pp. 881-887 (Year: 2007).*
International Preliminary Report on Patentability from corresponding International Application No. PCT/US2022/017187 dated Aug. 29, 2023.
Bartelmus, Zeitschrift fuer Analytische Chemie, 1977, vol. 286, pp. 161-190.
Sibilia, "A Guide to Materials Characterization and Chemical Analysis", VCH, 1988, pp. 81-84.
Yau, "Modem Size Exclusion Chromatography", Wiley-Interscience, 1979.

* cited by examiner

*Primary Examiner* — Cephia D Toomer
(74) *Attorney, Agent, or Firm* — Thomas S. Deibert

(57) ABSTRACT

A detergent formulation is provided including a detergent surfactant and a crosslinked cellulose ether containing 0.1 to 0.6 wt %, based on weight of the crosslinked cellulose ether, of polyether groups.

17 Claims, No Drawings

DETERGENT FORMULATION

The present invention relates to a detergent formulation. In particular, the present invention relates to a detergent formulation incorporating a detergent surfactant and a crosslinked cellulose ether containing 0.1 to 0.6 wt %, based on weight of the crosslinked cellulose ether, of polyether groups.

Detergent formulations in tablet form provide several advantages over formulations provided in particulate form; for example, ease of dosing, storage, transportation and handling.

Detergent formulations in tablet form are typically prepared by premixing ingredients of the detergent formulation and then forming the premixed ingredients into tablets using suitable equipment, for example a tablet press. The detergent tablets are typically formed using compression of the components to provide tablets that are sufficiently robust to facilitate transportation and handling without damage. In addition to robustness, the detergent tablets must still dissolve quickly enough such that the detergent ingredients may be released into the wash water as soon as possible at the beginning of the wash cycle.

A dichotomy persists in conventional formulations. Higher compressive force used in preparation of the detergent tablets generally correlates to improved robustness. While lower compressive force used in preparation of the detergent tablets generally correlates to improved (more rapid) dissolution in the wash water. This dichotomy is compounded by the fact that conventional detergent tablet formulations tend to exhibit relatively poor long term storage stability; which has historically been compensated for via the use of a higher compression specification during manufacture.

One detergent tablet composition is described by Whitaker et al U.S. Pat. No. 6,974,789. Whitaker et al. discloses a detergent tablet for use in a washing machine, the tablet having two or more phases at least one of which comprises one or more of the following: a) a polymeric disintegrant having a particle size distribution such that at least 90% by weight thereof has a particle size below about 0.3 mm and at least 30% by weight thereof has a particle size below about 0.2 mm; or b) a water soluble hydrated salt having a solubility in distilled water of at least about 25 g/100 g at 25° C.; wherein said salt is selected from hydrates of sodium acetate, sodium metaborate, sodium orthophosphate, sodium dihydrogenphosphate, disodium hydrogen phosphate, sodium potassium tartrate, potassium aluminum sulphate, calcium bromide, calcium nitrate, sodium citrate, potassium citrate and mixtures thereof; and wherein said detergent tablet comprises: i) a first phase in the form of a shaped body having at least one mold therein, the shaped body being compressed at a pressure of at least 250 $kg/cm^2$; and ii) a second phase is in the form of a compressed particulate solid affixed within said mold, the compressed particulate solid being compressed at a pressure of less than about 350 $kg/cm^2$.

Notwithstanding there remains a need for new detergent tablet formulations. In particular, there remains a need for new detergent tablet formulations that exhibit robustness for transportation and handling while also rapidly dissolving upon introduction to water.

The present invention provides a detergent formulation, comprising: a detergent surfactant and a crosslinked cellulose ether containing 0.1 to 0.6 wt %, based on weight of the crosslinked cellulose ether, of polyether groups.

The present invention provides a detergent formulation, comprising: a detergent; a crosslinked cellulose ether containing 0.1 to 0.6 wt %, based on weight of the crosslinked cellulose ether, of polyether groups; a solvent; and a binder; wherein the crosslinked cellulose ether is an irreversibly crosslinked cellulose ether; and wherein the detergent formulation is a detergent tablet.

The present invention provides a method of washing a soiled fabric article, comprising: providing a soiled fabric article; providing a detergent formulation according to the present invention; providing a wash water; providing a rinse water; applying the wash water and the detergent formulation to the soiled fabric article to provide a cleaned fabric article; and rinsing the washed fabric article with the rinse water.

DETAILED DESCRIPTION

Surprisingly, the detergent tablet formulations of the present invention including a crosslinked cellulose ether containing 0.1 to 0.6 wt %, based on weight of the crosslinked cellulose ether, of polyether groups; exhibit significantly higher tensile properties compared to conventional binder/structurant ingredients while simultaneously demonstrating good dissolution properties with equivalent primary cleaning performance. Moreover, incorporation of the crosslinked cellulose ether containing 0.1 to 0.6 wt %, based on weight of the crosslinked cellulose ether; allows for the substitution of water for propylene glycol conventionally used in detergent tablet formulations; significantly reducing the cost of the formulation and improving its environmental profile of the detergent tablet formulation while simultaneously maintaining equivalent primary cleaning performance.

Unless otherwise indicated, ratios, percentages, parts, and the like are by weight. Weight percentages (or wt %) in the composition are percentages of dry weight, i.e., excluding any water that may be present in the composition. Percentages of monomer units in the polymer are percentages of solids weight, i.e., excluding any water present in a polymer emulsion.

As used herein, unless otherwise indicated, the terms "weight average molecular weight" and "Mw" are used interchangeably to refer to the weight average molecular weight as measured in a conventional manner with gel permeation chromatography (GPC) and conventional standards, such as polystyrene standards. GPC techniques are discussed in detail in Modem Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Weight average molecular weights are reported herein in units of Daltons.

The term "phosphate-free" as used herein and in the appended claims means compositions containing ≤1 wt % (preferably, ≤0.5 wt %; more preferably, ≤0.2 wt %; still more preferably, ≤0.01 wt %; yet still more preferably, ≤0.001 wt %; most preferably, less than the detectable limit) of phosphate (measured as elemental phosphorus).

The term "DS" as used herein and in the appended claims means the number of alkyl substituted OH groups per anhydroglucose unit in a cellulose ether, as determined by the Zeisel Method.

The term "DS (methyl)" or "DS (M)" as used herein and in the appended claims means the number of methyl substituted OH groups per anhydroglucose unit in a cellulose ether, as determined by the Zeisel Method.

The term "MS" as used herein and in the appended claims means the number of moles of etherification reagent which are bound as ether per mol of anhydroglucose unit as hydroxyalkyl substituents in a cellulose ether, as determined by the Zeisel Method.

The term "MS (hydroxyethyl)" or "MS (HE)" as used herein and in the appended claims means the number of moles of etherification reagent which are bound as ether per mol of anhydroglucose unit as hydroxyethyl substituents in a cellulose ether, as determined by the Zeisel Method.

The term "MS (hydroxypropyl)" or "MS (HP)" as used herein and in the appended claims means the number of moles of etherification reagent which are bound as ether per mol of anhydroglucose unit as hydroxypropyl substituents in a cellulose ether, as determined by the Zeisel Method.

The term "Zeisel Method" refers to the Zeisel cleavage procedure for determination of MS and DS. See G. Bartelmus and R. Ketterer, *Zeitschrift fuer Analytische Chemie*, Vol. 286 (1977, Springer, Berline, DE), pages 161-190.

Preferably, the detergent formulation of the present invention is selected from a liquid detergent, a detergent tablet, a detergent granule and a powder detergent. More preferably, the detergent formulation of the present invention is selected from the group consisting of at least one of a liquid laundry detergent formation, a liquid dishwashing detergent formulation, a detergent tablet (or pearl) for laundry or dish care, a toilet tablet, a granulated laundry detergent formulation, a granulated dishwashing detergent formulation, a powder laundry detergent formulation and a powder dishwashing detergent formulation. Most preferably, the detergent formulation of the present invention is a detergent tablet for laundry or dish care (preferably, for laundry).

Preferably, the detergent formulation (preferably, a detergent tablet formulation) of the present invention, comprises: a detergent surfactant (preferably, 5 to 65 wt % (preferably, 10 to 60 wt %; more preferably, 20 to 55 wt %; most preferably, 40 to 50 wt %), based on weight of the detergent formulation, of the detergent surfactant) and a crosslinked cellulose ether containing 0.1 to 0.6 wt %, based on weight of the crosslinked cellulose ether, of polyether groups (preferably, 0.1 to 25 wt % (preferably, 0.5 to 20 wt %; more preferably, 1 to 17.5 wt %; most preferably, 5 to 15 wt %), based on weight of the detergent formulation, of the crosslinked cellulose ether).

Preferably, the detergent formulation of the present invention, comprises: a detergent surfactant. More preferably, the detergent formulation of the present invention, comprises: 5 to 65 wt % (more preferably, 10 to 60 wt %; still more preferably, 20 to 55 wt %; most preferably, 40 to 50 wt %), based on weight of the detergent formulation, of a detergent surfactant. Still more preferably, the detergent formulation of the present invention, comprises: 5 to 65 wt % (more preferably, 10 to 60 wt %; still more preferably, 20 to 55 wt %; most preferably, 40 to 50 wt %), based on weight of the detergent formulation, of a detergent surfactant; wherein the detergent surfactant is selected from the group consisting of anionic surfactants, nonionic surfactants, cationic surfactants, amphoteric surfactants and mixtures thereof. Most preferably, the detergent formulation of the present invention, comprises: 5 to 65 wt % (more preferably, 10 to 60 wt %; still more preferably, 20 to 55 wt %; most preferably, 40 to 50 wt %), based on weight of the detergent formulation, of a detergent surfactant; wherein the detergent surfactant is selected from the group consisting of a mixture including an anionic surfactant and a nonionic surfactant.

Anionic surfactants include alkyl sulfates, alkyl benzene sulfates, alkyl benzene sulfonic acids, alkyl benzene sulfonates, alkyl polyethoxy sulfates, alkoxylated alcohols, paraffin sulfonic acids, paraffin sulfonates, olefin sulfonic acids, olefin sulfonates, alpha-sulfocarboxylates, esters of alpha-sulfocarboxylates, alkyl glyceryl ether sulfonic acids, alkyl glyceryl ether sulfonates, sulfates of fatty acids, sulfonates of fatty acids, sulfonates of fatty acid esters, alkyl phenols, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, amine oxides and mixtures thereof. Preferred anionic surfactants include $C_{8-20}$ alkyl benzene sulfates, $C_{8-20}$ alkyl benzene sulfonic acid, $C_{8-20}$ alkyl benzene sulfonate, paraffin sulfonic acid, paraffin sulfonate, alpha-olefin sulfonic acid, alpha-olefin sulfonate, alkoxylated alcohols, $C_{8-20}$ alkyl phenols, amine oxides, sulfonates of fatty acids, sulfonates of fatty acid esters, $C_{8-20}$ alkyl polyethoxy sulfates and mixtures thereof. More preferred anionic surfactants include $C_{10-13}$ alkyl benzene sulfonic acid, $C_{10-13}$ alkyl benzene sulfonate, $C_{10-13}$ paraffin-sulfonic acid, $C_{10-13}$ paraffin-sulfonate, $C_{10-13}$ alkyl polyethoxy sulfate and mixtures thereof. Most preferred anionic surfactants include $C_{10-13}$ alkyl benzene sulfonate.

Non-ionic surfactants include alkoxylates, polyglycol ethers, fatty alcohol polyglycol ethers, alkylphenol polyglycol ethers, end group capped polyglycol ethers, mixed ethers, hydroxy mixed ethers, fatty acid polyglycol esters and mixtures thereof. Preferred non-ionic surfactants include alkoxylates. More preferred non-ionic surfactants are according to formula I (I)

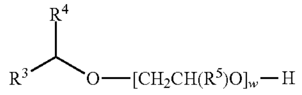

wherein w is an average of 5 to 40 (preferably, 7 to 27; more preferably, 8 to 20; most preferably, 7 to 12); wherein $R^3$ is selected from the group consisting of a hydrogen and a linear or branched $C_{1-20}$ alkyl group (preferably, a hydrogen, and a linear or branched $C_{1-15}$ alkyl group; more preferably, a linear $C_{1-15}$ alkyl group); wherein $R^4$ is selected from the group consisting of a linear or branched $C_{1-20}$ alkyl group and a linear or branched $C_{1-4}$ hydroxyalkyl group (preferably, a linear or branched $C_{1-15}$ alkyl group and a linear or branched $C_{1-4}$ hydroxyalkyl group; more preferably, a linear $C_{1-15}$ alkyl group and a linear or branched $C_{1-3}$ hydroxyalkyl group; most preferably, a linear $C_{1-15}$ alkyl group); wherein each $R^5$ is independently selected from the group consisting of a hydrogen, a methyl group, an ethyl group, a n-propyl group, an iso-propyl group, a n-butyl group, a 2-butyl group and a 2-methyl-2-butyl group (preferably, a hydrogen, a methyl group and an ethyl group; more preferably, a hydrogen and a methyl group; most preferably, a hydrogen); and with the proviso that sum of the total number of carbon atoms in $R^3$ and $R^4$ is 5 to 21 (preferably, 6 to 20 carbon atoms; more preferably, 7 to 18 carbon atoms; most preferably, 11 to 15 carbon atoms). Still more preferred nonionic surfactants are according to formula I; wherein w is an average of 8 to 16; wherein $R^3$ is selected from the group consisting of a hydrogen and a linear $C_{1-15}$ alkyl group; wherein $R^4$ is selected from the group consisting of a linear or branched $C_{1-15}$ alkyl group and a linear or branched $C_{1-4}$ hydroxyalkyl; wherein $R^5$ is selected from the group consisting of a hydrogen, a methyl group and an ethyl group; and with the proviso that the sum of the total number of carbon atoms in $R^3$ and $R^4$ is 6 to 20. Most preferred nonionic surfactants are according to formula I; wherein w is an average of 7 to 12; wherein $R^3$ is selected from the group consisting of a hydrogen and a linear $C_{1-15}$ alkyl group; wherein $R^4$ is selected from the group consisting of a linear $C_{1-15}$ alkyl group and a linear or branched $C_{1-3}$ hydroxyalkyl group; wherein $R^5$ is a hydrogen; and with the proviso that the sum of the total number of carbon atoms in $R^3$ and $R^4$ is 7 to 18.

Cationic surfactants include quaternary surface active compounds. Preferred cationic surfactants include quaternary surface active compounds having at least one of an ammonium group, a sulfonium group, a phosphonium group, an iodonium group and an arsonium group. More preferred cationic surfactants include at least one of a dialkyldimethylammonium chloride and alkyl dimethyl benzyl ammonium chloride. Still more preferred cationic surfactants include at least one of $C_{16-18}$ dialkyldimethylammonium chloride, a $C_{8-18}$ alkyl dimethyl benzyl ammonium chloride di-tallow dimethyl ammonium chloride and di-tallow dimethyl ammonium chloride. Most preferred cationic surfactant includes di-tallow dimethyl ammonium chloride.

Amphoteric surfactants include betaines, amine oxides, alkylamidoalkylamines, alkyl-substituted amine oxides, acylated amino acids, derivatives of aliphatic quaternary ammonium compounds and mixtures thereof. Preferred amphoteric surfactants include derivatives of aliphatic quaternary ammonium compounds. More preferred amphoteric surfactants include derivatives of aliphatic quaternary ammonium compounds with a long chain group having 8 to 18 carbon atoms. Still more preferred amphoteric surfactants include at least one of $C_{12-14}$ alkyldimethylamine oxide, 3-(N,N-dimethyl-N-hexadecyl-ammonio)propane-1-sulfonate, 3-(N,N-dimethyl-N-hexadecylammonio)-2-hydroxypropane-1-sulfonate. Most preferred amphoteric surfactants include at least one of $C_{12-14}$ alkyldimethylamine oxide.

Preferably, the detergent formulation of the present invention, comprises: 0.1 to 25 wt % (preferably, 0.5 to 20 wt %; more preferably, 1 to 17.5 wt %; most preferably, 5 to 15 wt %), based on weight of the detergent formulation, of a crosslinked cellulose ether containing 0.1 to 0.6 wt %, based on weight of the crosslinked cellulose ether, of polyether groups. More preferably, the detergent formulation of the present invention, comprises: 0.1 to 25 wt % (preferably, 0.5 to 20 wt %; more preferably, 1 to 17.5 wt %; most preferably, 5 to 15 wt %), based on weight of the detergent formulation, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups and wherein the base cellulose ether is a mixed cellulose ether containing hydroxyalkyl ether groups and alkyl ether groups. Still more preferably, the detergent formulation of the present invention, comprises: 0.1 to 25 wt % (preferably, 0.5 to 20 wt %; more preferably, 1 to 17.5 wt %; most preferably, 5 to 15 wt %), based on weight of the detergent formulation, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups and wherein the base cellulose ether is selected from the group consisting of hydroxyethyl methylcellulose, hydroxypropyl methyl cellulose, methyl hydroxyethyl hydroxypropylcellulose, ethyl hydroxyethyl cellulose and combinations thereof. Most preferably, the detergent formulation of the present invention, comprises: 0.1 to 25 wt % (preferably, 0.5 to 20 wt %; more preferably, 1 to 17.5 wt %; most preferably, 5 to 15 wt %), based on weight of the detergent formulation, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups and wherein the base cellulose ether is hydroxyethyl methylcellulose.

Preferably, the detergent formulation of the present invention, comprises: 0.1 to 25 wt % (preferably, 0.5 to 20 wt %; more preferably, 1 to 17.5 wt %; most preferably, 5 to 15 wt %), based on weight of the detergent formulation, of a crosslinked cellulose ether containing 0.1 to 0.6 wt %, based on weight of the crosslinked cellulose ether, of polyether groups; wherein the crosslinked cellulose either is an irreversibly crosslinked cellulose ether. More preferably, the detergent formulation of the present invention, comprises: 0.1 to 25 wt % (preferably, 0.5 to 20 wt %; more preferably, 1 to 17.5 wt %; most preferably, 5 to 15 wt %), based on weight of the detergent formulation, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups; wherein the base cellulose ether is a mixed cellulose ether containing hydroxyalkyl ether groups and alkyl ether groups and wherein the crosslinked cellulose either is an irreversibly crosslinked cellulose ether. Still more preferably, the detergent formulation of the present invention, comprises: 0.1 to 25 wt % (preferably, 0.5 to 20 wt %; more preferably, 1 to 17.5 wt %; most preferably, 5 to 15 wt %), based on weight of the detergent formulation, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups; wherein the base cellulose ether is selected from the group consisting of hydroxyethyl methylcellulose, hydroxypropyl methyl cellulose, methyl hydroxyethyl hydroxypropylcellulose, ethyl hydroxyethyl cellulose and combinations thereof and wherein the crosslinked cellulose either is an irreversibly crosslinked cellulose ether. Most preferably, the detergent formulation of the present invention, comprises: 0.1 to 25 wt % (preferably, 0.5 to 20 wt %; more preferably, 1 to 17.5 wt %; most preferably, 5 to 15 wt %), based on weight of the detergent formulation, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups; wherein the base cellulose ether is hydroxyethyl methylcellulose and wherein the crosslinked cellulose either is an irreversibly crosslinked cellulose ether.

Preferably, the crosslinked cellulose ether contains 0.1 to 0.6 wt % (preferably, 0.12 to 0.6 wt %; more preferably, 0.12 to 0.45 wt %; most preferably, 0.12 to 0.29 wt %), based on weight of the crosslinked cellulose ether, of polyether groups. More preferably, the crosslinked cellulose ether contains 0.1 to 0.6 wt % (preferably, 0.12 to 0.6 wt %; more preferably, 0.12 to 0.45 wt %; most preferably, 0.12 to 0.29 wt %), based on weight of the crosslinked cellulose ether, of polyether groups; wherein the polyether groups are polyoxyalkylene groups having 2 to 100 (preferably, 2 to 20;

more preferably, 3 to 15) oxyalkylene groups per crosslink. Most preferably, the crosslinked cellulose ether contains 0.1 to 0.6 wt % (preferably, 0.12 to 0.6 wt %; more preferably, 0.12 to 0.45 wt %; most preferably, 0.12 to 0.29 wt %), based on weight of the crosslinked cellulose ether, of polyether groups; wherein the polyether groups are polyoxypropylene groups having 2 to 100 (preferably, 2 to 20; more preferably, 3 to 15) oxypropylene groups per crosslink.

Preferably, crosslinked cellulose ether comprises a base cellulose ether having crosslinks containing 0.1 to 0.6 wt %, based on weight of the crosslinked cellulose ether, of polyether groups. Preferably, the base cellulose ether is selected from hydroxyalkyl cellulose ethers, alkyl cellulose ethers and combinations thereof. Examples of base cellulose ethers include, for example, methylcellulose, ethylcellulose, propylcellulose, butylcellulose, hydroxyethyl methylcellulose, hydroxypropyl methylcellulose, hydroxyethylcellulose, ethylhydroxyethylcellulose, methylethylhydroxyethylcellulose, hydrophobically modified ethylhydroxyethylcellulose, hydrophobically modified hydroxyethylcellulose, sulfoethyl methylhydroxyethylcellulose, sulfoethyl methylhydroxypropylcellulose and sulfoethyl hydroxyethylcellulose. Preferably, the base cellulose ethers are mixed cellulose ethers that contain both hydroxyalkyl ether groups and alkyl ether groups, such as, alkyl hydroxyethyl cellulose and hydroxyalkyl methylcellulose (e.g., hydroxyethyl methylcellulose, hydroxypropyl methylcellulose, methyl hydroxyethyl hydroxypropylcellulose and ethylhydroxyethyl cellulose).

Preferably, the base cellulose ether contains hydroxyalkyl ether substitutions. More preferably, the base cellulose ether has a degree of hydroxyethyl ether substitutions, MS (HE), or hydroxypropyl ether substitutions, MS (HP), of 1.5 to 4.5 (preferably, 2.0 to 3.0).

Preferably, the base cellulose ether contains methyl ether substitutions. More preferably, the base cellulose ether has a degree of methyl ether substitution, DS (M), of 1.2 to 2.1 (preferably, 1.3 to 1.7; more preferably, 1.35 to 1.60).

Preferably, the base cellulose ether is a mixed cellulose ether containing hydroxyalkyl ether substitutions and alkyl ether substitutions. More preferably, the base cellulose ether is a mixed cellulose ether having a degree of hydroxyethyl ether substitution, MS (HE), of 0.05 to 0.75 (preferably, 0.15 to 0.45; more preferably, 0.20 to 0.40) and a degree of methyl ether substitution, DS (M), of 1.2 to 2.1 (preferably, 1.3 to 1.7, more preferably, 1.35 to 1.60).

Preferably, the base cellulose ether is a mixed cellulose ether containing hydroxyalkyl ether substitutions and alkyl ether substitutions. More preferably, the base cellulose ether is a mixed cellulose ether having a degree of hydroxypropyl ether substitution, MS (HP), of 0.1 to 1.5 (preferably, 0.2 to 1.2) and a degree of methyl ether substitution, DS (M), of 1.2 to 2.1 (preferably, 1.3 to 2.0).

Preferably, the crosslinked cellulose ether comprises a base cellulose ether having crosslinks containing 0.1 to 0.6 wt %, based on weight of the crosslinked cellulose ether, of polyether groups; wherein the base cellulose ether is a hydroxyethyl methyl cellulose and wherein the crosslinks are polyoxypropylene dioxyethylene ether crosslinks, such as those produced as the reaction product of hydroxyethyl methyl cellulose with polypropylene glycol (PPG) glycidylether.

Crosslinking agents used to crosslink the base cellulose ether to form the crosslinked cellulose ether include compounds having a polyoxyalkylene or polyalkylene glycol group and two or more (preferably, two) crosslinking groups, such as, halogen groups, glycidyl or epoxy groups, and ethylenically unsaturated groups (e.g., vinyl groups) that form ether bonds with the base cellulose ether to form the crosslinked cellulose ether. Preferably, the crosslinking agent is selected from the group consisting of 1,2-dichloro (poly)alkoxy ethers, dichloropolyoxyethylene, diglycidyl polyalkoxy ethers, diglycidyl phosphonate, divinyl polyoxyalkylenes containing a sulphone group. Crosslinking agents having two different types of functional groups can be used. Examples include diglycidyl polyoxypropylenes and glycidyl(poly)oxyalkyl methacrylate. Preferably, the crosslinking agent contains 2 to 100 (preferably, 2 to 20; more preferably, 3 to 15) oxyalkylene groups per molecule.

Preferably, the amount of crosslinking agent included in the crosslinked cellulose ether ranges from 0.0001 to 0.05 eq (preferably, 0.0005 to 0.01 eq; more preferably, 0.001 to 0.005 eq), wherein the unity "eq" represents the molar ratio of moles of the crosslinking agent relative to the number of moles of anhydroglucose units (AGU) in the base cellulose ether.

Preferably, the crosslinked cellulose ether is an irreversibly crosslinked cellulose ether. That is, the crosslinks in the crosslinked cellulose ether do not break down during the intended use of the crosslinked cellulose ether under normal conditions. In contrast, reversible crosslinks will break down during the intended use of the crosslinked cellulose ether under normal conditions. An example of reversible crosslinks in cellulose ethers intended for use in detergent formulations are those created using aldehyde based crosslinkers (e.g., glyoxal), which crosslinks break down upon dissolution of the crosslinked material in water.

Preferably, the detergent formulation of the present invention comprises <0.5 wt % (preferably, <0.01 wt %; more preferably, <0.001 wt %; still more preferably, <0.0001 wt %; most preferably, <the detectable limit), based on weight of the detergent formulation, of crosslinked carboxymethylcellulose.

Preferably, the detergent formulation of the present invention, further comprises at least one optional ingredient selected from the group consisting of solvent, binders, bleaching agents, bleach activators, stabilizers, foam regulators, enzymes, optical brighteners, fillers, processing aids and fragrances.

Preferably, the detergent formulation of the present invention, optionally further comprises a solvent. More preferably, the detergent formulation of the present invention, optionally further comprises 0 to 45 wt % (preferably, 0.1 to 40 wt %; more preferably, 5 to 35 wt %; most preferably, 15 to 30 wt %), based on weight of the detergent formulation, of a solvent. Still more preferably, the detergent formulation of the present invention, optionally further comprises 0 to 45 wt % (preferably, 0.1 to 40 wt %; more preferably, 5 to 35 wt %; most preferably, 15 to 30 wt %), based on weight of the detergent formulation, of a solvent; wherein the solvent is selected from the group consisting of water, an organic solvent and mixtures thereof. Yet more preferably, the detergent formulation of the present invention, optionally further comprises 0 to 45 wt % (preferably, 0.1 to 40 wt %; more preferably, 5 to 35 wt %; most preferably, 15 to 30 wt %), based on weight of the detergent formulation, of a solvent; wherein the solvent is selected from the group consisting of water, an organic solvent and mixtures thereof; wherein the organic solvent is selected from the group consisting of an aliphatic alcohol (e.g., $C_{1-6}$ alkanols, $C_{1-6}$ alkyl diols); a monoalkylene glycol ether (e.g., ethylene glycol propyl ether, ethylene glycol n-butyl ether, ethylene glycol t-butyl ether, propylene glycol propyl ether, propylene glycol n-butyl ether, propylene glycol t-butyl ether, propylene glycol methyl ether acetate, propylene glycol diacetate); a polyalkylene glycol ether (e.g., diethylene glycol ethyl ether, diethylene glycol propyl ether, diethylene glycol n-butyl ether, diethylene glycol t-butyl ether, diethylene glycol hexyl ether, dipropylene glycol methyl ether, dipropylene glycol ethyl ether, dipropylene glycol propyl ether, dipropylene glycol n-butyl ether, dipropylene glycol t-butyl ether, dipropylene glycol phenyl ether, dipropylene glycol methyl ether acetate, tripropylene glycol methyl ether, tripropylene glycol ethyl ether, tripropylene glycol propyl ether, tripropylene glycol n-butyl ether, tripropylene glycol t-butyl ether) and mixtures thereof. Most preferably, the detergent formulation of the present invention, optionally further comprises 0 to 45 wt % (preferably, 0.1 to 40 wt %; more preferably, 5 to 35 wt %; most preferably, 15 to 30 wt %), based on weight of the detergent formulation, of a solvent; wherein the solvent is selected from (i) a mixture of water and dipropylene glycol n-butyl ether and (ii) a mixture of propylene glycol and dipropylene glycol n-butyl ether.

Preferably, the detergent formulation of the present invention, optionally further comprises a binder. More preferably, the detergent formulation of the present invention, optionally further comprises 0 to 30 wt % (preferably, 0.1 to 30 wt %; more preferably, 5 to 25 wt %; most preferably, 10 to 20 wt %), based on weight of the detergent formulation, of a binder. Still more preferably, the detergent formulation of the present invention, optionally further comprises 0 to 30 wt % (preferably, 0.1 to 30 wt %; more preferably, 5 to 25 wt %; most preferably, 10 to 20 wt %), based on weight of the detergent formulation, of a binder; wherein the binder is selected from the group consisting of $C_{10-20}$ alcohol ethoxylates containing 5 to 100 moles of ethylene oxide per mole of alcohol (preferably, $C_{15-20}$ primary alcohol ethoxylates containing 20 to 100 moles of ethylene oxide per mole of alcohol); polyvinylpyrrolidones with an average molecular weight of 12,000 to 700,000 Daltons; polypropylene glycols with an average molecular weight of 600 to 5,000,000 Daltons (preferably, 1,000 to 400,000 Daltons; more preferably, 1,000, to 10,000 Daltons); polyethylene glycols with an average molecular weight of 600 to 5,000,000 Daltons (preferably, 1,000 to 400,000 Daltons; more preferably, 1,000, to 10,000 Daltons); copolymers of maleic anhydride with ethylene, methylvinyl ether or methacrylic acid, wherein the maleic anhydride comprises at least 20 mole percent of the copolymer; $C_{10-20}$ mono and diglycerol ethers; $C_{10-20}$ fatty acids; cellulose derivatives such as methyl cellulose, carboxymethyl cellulose and hydroxyethyl cellulose; homo and copolymeric polycarboxylic acids and salts thereof; and mixtures thereof. Most preferably, the detergent formulation of the present invention, optionally further comprises 0 to 30 wt % (preferably, 0.1 to 30 wt %; more preferably, 5 to 25 wt %; most preferably, 10 to 20 wt %), based on weight of the detergent formulation, of a binder; wherein the binder is a polyethylene glycols with an average molecular weight of 600 to 5,000,000 Daltons (preferably, 1,000 to 400,000 Daltons; more preferably, 1,000, to 10,000 Daltons).

Preferably, the detergent formulation of the present invention, further comprises 0 to 10 wt %, based on weight of the detergent formulation, of a bleaching agent. Preferred bleaching agents include, for example, sodium perborate and sodium percarbonate.

Preferably, the detergent formulation of the present invention, further comprises 0 to 10 wt %, based on weight of the detergent formulation, of a bleach activator. Preferred bleach activators include, for example, tetra acetyl ethylene diamine (TAED) and sodium nonanoyloxybenzene sulfonate (NOBS).

Preferably, the detergent formulation of the present invention, further comprises 0 to 1 wt %, based on weight of the detergent formulation, of a stabilizer. Preferred stabilizers include, for example, phosphonates.

Preferably, the detergent formulation of the present invention, further comprises 0 to 2 wt % (preferably, 0.01 to 2 wt %), based on weight of the detergent formulation, of a fragrance.

Preferably, the detergent formulation of the present invention, further comprises 0 to 2 wt % (preferably, 0.1 to 2 wt %), based on weight of the detergent formulation, of an enzyme. More preferably, the detergent formulation of the present invention, further comprises 0 to 2 wt % (preferably, 0.1 to 2 wt %), based on weight of the detergent formulation, of an enzyme; wherein the enzyme is selected from the group consisting of a protease, a cellulase, a amylase, a mannanase, a lipase and mixtures thereof. Most preferably, the detergent formulation of the present invention, further comprises 0 to 2 wt % (preferably, 0.1 to 2 wt %), based on weight of the detergent formulation, of an enzyme; wherein the enzyme includes a mixture of a protease, an amylase and a mannanase.

Preferably, the detergent formulation of the present invention, further comprises 0 to 0.3 wt %, based on weight of the detergent formulation, of an optical brightener. Preferred optical brighteners include, for example, fluorescent whitening agents.

Preferably, the detergent formulation of the present invention, further comprises 0 to 74.09 wt % (preferably, 0.1 to 74.09 wt %; more preferably, 5 to 70 wt %), based on weight of the detergent formulation of a filler. More preferably, the detergent formulation of the present invention, further comprises 0 to 74.09 wt % (preferably, 0.1 to 74.09 wt %; more preferably, 5 to 70 wt %), based on weight of the detergent formulation of a filler; wherein the filler includes at least one of sodium sulfate, sodium chloride, calcite and dolomite. Most preferably, the detergent formulation of the present invention, further comprises 0 to 74.09 wt % (preferably, 0.1 to 74.09 wt %; more preferably, 5 to 70 wt %), based on weight of the detergent formulation of a filler; wherein the filler is selected from the group consisting of sodium sulfate, sodium chloride, calcite, dolomite and mixtures thereof.

Preferably, the detergent formulation of the present invention, further comprises a solvent and a binder; wherein the detergent formulation is a detergent tablet. More preferably, the detergent formulation of the present invention, further comprises a solvent, a binder, a fragrance and an enzyme; wherein the detergent formulation is a detergent tablet. Most preferably, the detergent formulation of the present invention, further comprises 0.1 to 40 wt % (preferably, 5 to 35 wt %; more preferably, 15 to 30 wt %), based on weight of the detergent formulation, of a solvent; 0.1 to 30 wt % (preferably, 5 to 25 wt %; more preferably, 10 to 20 wt %), based on weight of the detergent formulation, of a binder; 0.01 to 2 wt %, based on weight of the detergent formulation, of a fragrance; and 0.05 to 2 wt %, based on weight of the detergent formulation, of an enzyme; wherein the detergent formulation is a detergent tablet.

Preferably, the method of washing a soiled fabric article of the present invention, comprises: providing a soiled fabric article (preferably, wherein the soiled fabric article comprises cotton; more preferably, wherein the soiled fabric article is selected from cotton and a polyester cotton blend); providing a wash water; providing a rinse water; providing a detergent formulation of the present invention; applying the wash water and the detergent formulation to the soiled fabric article to provide a washed fabric article; and then rinsing the washed fabric article with the rinse water. More preferably, the method of washing a soiled fabric article of the present invention, comprises: providing a soiled fabric article (preferably, wherein the soiled fabric article comprises cotton; more preferably, wherein the soiled fabric article is selected from cotton and a polyester cotton blend); providing a wash water; providing a rinse water; providing a detergent formulation of the present invention; applying the wash water and the detergent formulation to the soiled fabric article to provide a washed fabric article; and then rinsing the washed fabric article with the rinse water; wherein the detergent formulation is a detergent tablet.

Preferably, in the method of washing a soiled fabric article of the present invention, the soiled fabric article is treated with the detergent formulation and the wash water using well known techniques. Preferably, the detergent formulation is mixed with the wash water at a weight ratio of detergent formulation to wash water of 1:100 to 1:1,000.

Some embodiments of the present invention will now be described in detail in the following Examples.

Synthesis 1: Crosslinked Cellulose Ether

The crosslinking agent used in Synthesis 1 was a linear poly(propyleneglycol) diglycidyl ether made from polypropylene glycol (PPG) having a molecular weight of ~400 Daltons and having the formula

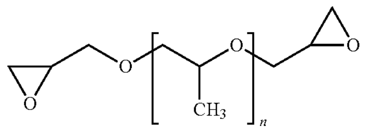

wherein n is 5.7 to 6.7 (available from Leuna-Harze GmbH, Leuna, DE as EPILOX™ M985 poly(propyleneglycol) diglycidylether crosslinker).

Ground cellulose flock (1.5 mol) was added to a 5 L autoclave. After purging the autoclave trice with nitrogen gas, the contents of the autoclave were heated to 40° C. Then dimethylether (DME, 4.7 mol/mol of anhydroglucose units (AGU)) and methyl chloride (MCl; 3.2 mol/mol AGU) were injected into the autoclave. Causting soda (NaOH, strength 50 wt % aqueous, 1.9 mol NaOH/mol AGU) was added to the autoclave in 3 portions during 2 minutes at a temperature of 40° C. The reaction mixture was held at 40° C. for 30 minutes. Ethylene oxide (0.45 mol/mol AGU) was then added and the reaction mixture was held for 10 minutes at 40° C. The crosslinker (EPILOX™ M985 crosslinker; 0.0025 mol/mol AGU) was dissolved in 20 mL of isopropanol and added to the contents of the autoclave in six increments in 30 second intervals. The contents of the autoclave were then heated to 80° C. in 40 minutes. At 80° C. a water soluble monovalent copper ligant (MCL 2; 1.3 mol/mol AGU) was injected into the autoclave quickly. Afterwards, NaOH (0.67 mol/mol AGU) was added in 7 portions over 30 minutes, followed by a 70 minute cook-off time at 80° C. Following this, the product crosslinked cellulose ether was washed in hot (>95° C.) water, neutralized with formic acid, granulated, dried and milled.

Comparative Example C1 and Examples 1-2: Detergent Tablet

Detergent tablets were prepared in each of Comparative Example C1 and Examples 1-2 having the composition set forth in Table 1. The polyethylene glycol was added to a vessel with heating set at 80° C. with stirring (4 bladed propeller at 200 rmp). Then the solvent (propylene glycol, deminieralized water, glycol ether solvent) were added to the vessel contents with continued stirring. Then the surfactancts (secondary alcohol ethoxylate, nonionic surfactant, sodium $C_{10-13}$ alkylbenzent sulfonate) were added to the vessel contents with continued stirring. The cellulose material (multifunctional cellulose derivative, Product of Example S1) was added to the vessel contents with continued stirring. The set point temperature was then reduced. When the temperature of the vessel contents reached 60° C., the fragrance, enzyme amylase and mannanase was added to the vessel contents with stirring until homogeneous. The vessel contents were then poured into a mold to form the detergent tablets. Once solidified, the detergent tablets were removed from the mold and allowed to set for 24 hours before testing.

TABLE 1

| | (wt %) | | |
|---|---|---|---|
| Ingredient | C1 | 1 | 2 |
| Polyethylene glycol[1] | 16.8 | 16.8 | 16.8 |
| Propylene glycol | 13.8 | 13.8 | 0 |
| Demineralized water | 0 | 0 | 13.8 |
| Glycol ether solvent[2] | 11.7 | 11.7 | 11.7 |
| Secondary alcohol ethoxylate[3] | 11.5 | 11.5 | 11.5 |
| Nonionic surfactant[4] | 8.0 | 8.0 | 8.0 |
| Sodium $C_{10-13}$ alkylbenzene sulfonate[5] | 26.0 | 26.0 | 26.0 |
| Multifunctional cellulose derivative[6] | 9.9 | 0 | 0 |
| Product Example S1 | 0 | 9.9 | 9.9 |
| Antifoam[7] | 0.3 | 0.3 | 0.3 |
| Fragrance[8] | 0.9 | 0.9 | 0.9 |
| Enzyme[9] | 0.7 | 0.7 | 0.7 |
| Amylase[10] | 0.2 | 0.2 | 0.2 |
| Mannanase[11] | 0.2 | 0.2 | 0.2 |

[1]CARBOWAX™ polyethylene glycol 8000 powder available from The Dow Chemical Company

[2]DOWANOL™ DPnB solvent available from The Dow Chemical Company

[3]TERGITOL™ 15-S-9 surfactant available from The Dow Chemical Company

[4]ECOSURF™ EH-9 surfactant available from The Dow Chemical Company

[5]NANSA HS/80S $C_{10-13}$ alkylbenzene sulfonate available from Innospec Performance Chemicals

[6]SUPRACARE™ 760 additive available from The Dow Chemical Company

[7]DOWSIL™ AF-8017 antifoam available from The Dow Chemical Company

[8]Planet 34 fragrance available from Givaudan

[9]PREFERENZ ® P300 enzyme available from Essential Ingredients, Inc.

[10]PREFERENZ ® S210 amylase available from Essential Ingredients, Inc.

[11]PREFERENZ ® M100 alkaline mannanase available from Essential Ingredients, Inc.

Primary Cleaning Performance Test

The primary cleaning performance of the detergent tablets of Comparative Example C1 and Examples 1-2 were assessed in a Miele W1614 with Program set to cotton/40° C./1,000 rpm (124 min.). Each load took 10-11 liters of wash water with 25° French Hardness and 23 TAC. The soils used were 4 SBL 2004. Each load of laundry comprised 6 pillow cases, 5 huckaback towels and 1 bed sheet. Each load was prewashed (3 cycles) before testing. The stain fabrics (one with eleven stains-sebum with carbon black on Cotton; sebum with carbon black on polyester/cotton blend, grass/mud on polyester/cotton blend, dirty motor oil, tomato puree, chocolate drink on cotton, standard clay on cotton, red pottery clay on cotton, dry ink on cotton, spaghetti sauce and lard)(one with three stains-grass, balsamic salad dressing, and potato starch) were sewn onto a monitor placed in with the laundry load. Both of the monitors with stains were dried on drying line overnight. The stains were measured with a MACH 5+ instrument (L, a & b). The results are noted in Table 2, wherein ΔE* is according to the equation $$\Delta E^*=\Delta E_{aw}-\Delta E_{bw}$$

wherein $\Delta E_{aw}$ is measured from fabrics after washing, and $\Delta E_{bw}$ is measured from fabrics before washing. A higher ΔE* corresponds with better primary cleaning performance.

TABLE 2

| Fabric | Stain | Tablet Formulation | ΔE* |
|---|---|---|---|
| Cotton | Sebum with carbon black | Comp. Ex. C1 | 13 |
| | Sebum with carbon black | Example 1 | 11 |
| | Sebum with carbon black | Example 2 | 13 |
| | Chocolate drink | Comp. Ex. C1 | 7 |
| | Chocolate drink | Example 1 | 8 |
| | Chocolate drink | Example 2 | 10 |
| | Standard clay | Comp. Ex. C1 | 7 |
| | Standard clay | Example 1 | 6 |
| | Standard clay | Example 2 | 7.5 |
| | Red potter clay | Comp. Ex. C1 | 14 |
| | Red potter clay | Example 1 | 13 |
| | Red potter clay | Example 2 | 15 |
| | Dry ink | Comp. Ex. C1 | 23 |
| | Dry ink | Example 1 | 22 |
| | Dry ink | Example 2 | 22 |
| | Spaghetti sauce | Comp. Ex. C1 | 22 |
| | Spaghetti sauce | Example 1 | 21.5 |
| | Spaghetti sauce | Example 2 | 21.5 |
| | Lard | Comp. Ex. C1 | 38 |
| | Lard | Example 1 | 38.5 |
| | Lard | Example 2 | 37 |
| | Grass | Comp. Ex. C1 | 21 |
| | Grass | Example 1 | 17 |
| | Grass | Example 2 | 24 |
| | Balsamic salad dressing | Comp. Ex. C1 | 26 |
| | Balsamic salad dressing | Example 1 | 25 |
| | Balsamic salad dressing | Example 2 | 28 |
| | Potato starch | Comp. Ex. C1 | 43 |
| | Potato starch | Example 1 | 42 |
| | Potato starch | Example 2 | 43 |
| Poly/cotton blend | Sebum with carbon black | Comp. Ex. C1 | 16 |
| | Sebum with carbon black | Example 1 | 16 |
| | Sebum with carbon black | Example 2 | 15 |
| | Grass/mud | Comp. Ex. C1 | 14 |
| | Grass/mud | Example 1 | 12 |
| | Grass/mud | Example 2 | 14.5 |
| Knit cotton | Dirty motor oil | Comp. Ex. C1 | 15 |
| | Dirty motor oil | Example 1 | 13 |
| | Dirty motor oil | Example 2 | 15.5 |
| | Tomato puree | Comp. Ex. C1 | 25 |
| | Tomato puree | Example 1 | 23 |
| | Tomato puree | Example 2 | 24 |

Hardness

The indentation hardness of the detergent tablet material prepared according to Comparative Example C1 and Examples 1-2 were measured according to ASTM D 2240 using a Shore Instrument and Manufacturing Co. durometer. The average Shore A hardness of five separate measurements per detergent tablet material is provided in Table 3.

TABLE 3

| Example | Hardness Shore A |
|---|---|
| Comp. Ex. C1 | 5 |
| Example 1 | 13 |
| Example 2 | 18 |

We claim:

1. A detergent formulation, comprising:

a detergent surfactant; and a crosslinked cellulose ether containing 0.12 to 0.45 wt %, based on weight of the crosslinked cellulose ether, of polyether groups; wherein the crosslinked cellulose ether is an irreversibly crosslinked cellulose ether; wherein the irreversibly crosslinked cellulose ether comprises a base cellulose ether and crosslinks; wherein the crosslinks contain the polyether groups; and wherein the base cellulose ether contains hydroxyalkyl ether and alkyl ether groups; and wherein the polyether groups in the irreversibly crosslinked cellulose ether are polyoxyalkylene groups having 2 to 100 oxyalkylene groups per crosslink.

2. The detergent formulation of claim 1, wherein the detergent formulation is selected from the group consisting of a liquid detergent, detergent tablet and powder detergent.

3. The detergent formulation of claim 1, further comprising:

a solvent; and a binder;

wherein the detergent formulation is a detergent tablet.

4. The detergent formulation of claim 3, wherein the polyether groups in the irreversibly crosslinked cellulose ether are polyoxyalkylene groups having 2 to 20 oxyalkylene groups.

5. The detergent formulation of claim 4, wherein the polyoxyalkylene groups are selected from the group consisting of a polyoxyethylene, a polyoxypropylene and combinations thereof.

6. The detergent formulation of claim 5, wherein the base cellulose ether is selected from the group consisting of hydroxyethyl methylcellulose, hydroxypropyl methyl cellulose, methyl hydroxyethyl hydroxypropylcellulose, ethyl hydroxyethyl cellulose and combinations thereof.

7. The detergent formulation of claim 6, further comprising a fragrance and an enzyme.

8. A method of washing a soiled fabric article, comprising: providing a soiled fabric article; providing a detergent formulation according to claim 1; providing a wash water; providing a rinse water; applying the wash water and the detergent formulation to the soiled fabric article to provide a washed fabric article; and rinsing the washed fabric article with the rinse water.

9. The detergent formulation of claim 7, wherein the irreversibly crosslinked cellulose ether contains 0.12 to 0.29 wt %, based on weight of the irreversibly crosslinked cellulose ether, of polyether groups.

10. A detergent formulation, comprising:

20 to 55 wt %, based on weight of the detergent formulation, of a detergent surfactant; and 1 to 17.5 wt %, based on weight of the detergent formulation, of a crosslinked cellulose ether containing 0.12 to 0.45 wt %, based on weight of the crosslinked cellulose ether, of polyether groups; wherein the polyether groups are polyoxypropylene groups having 2 to 100 oxypropylene groups per crosslink; and wherein the crosslinked cellulose ether is an irreversibly crosslinked cellulose ether.

11. The detergent formulation of claim 10, wherein the irreversibly crosslinked cellulose ether comprises a base cellulose ether and crosslinks; wherein the crosslinks contain the polyether groups; and wherein the base cellulose ether is a hydroxyethyl methylcellulose.

12. The detergent formulation of claim 11, wherein the polyoxypropylene groups have 2 to 20 oxypropylene groups per crosslink.

13. The detergent formulation of claim 12, wherein the irreversibly crosslinked cellulose ether contains 0.12 to 0.29 wt %, based on weight of the irreversibly crosslinked cellulose ether, of polyether groups.

14. The detergent formulation of claim 13, wherein the detergent formulation comprises:

40 to 50 wt %, based on weight of the detergent formulation, of the detergent surfactant; and 5 to 15 wt %, based on weight of the detergent formulation, of the irreversibly crosslinked cellulose ether.

15. The detergent formulation of claim 11, wherein the polyoxypropylene groups have 3 to 15 oxypropylene groups per crosslink.

16. The detergent formulation of claim 15, wherein the irreversibly crosslinked cellulose ether contains 0.12 to 0.29 wt %, based on weight of the irreversibly crosslinked cellulose ether, of polyether groups.

17. The detergent formulation of claim 13, wherein the detergent formulation comprises:

40 to 50 wt %, based on weight of the detergent formulation, of the detergent surfactant; and 5 to 15 wt %, based on weight of the detergent formulation, of the irreversibly crosslinked cellulose ether.

* * * * *